US011085203B2

(12) United States Patent
Deminico (10) Patent No.: US 11,085,203 B2
(45) Date of Patent: Aug. 10, 2021

(54) SIGNAL BASED ARRANGEMENT OF PIN TUMBLER PINS

(71) Applicant: The Government of the United States, as represented by the Secretary of the Army, Washington, DC (US)

(72) Inventor: Mathew Deminico, Washington Township, MI (US)

(73) Assignee: The Government of the United States, as represented by the Secretary of the Army, Washington, DC (US)

( * ) Notice: Subject to any disclaimer, the term of this patent is extended or adjusted under 35 U.S.C. 154(b) by 233 days.

(21) Appl. No.: 16/170,388

(22) Filed: Oct. 25, 2018

(65) Prior Publication Data

US 2020/0131804 A1    Apr. 30, 2020

(51) Int. Cl.
| | |
|---|---|
| *E05B 47/06* | (2006.01) |
| *H04L 9/06* | (2006.01) |
| *E05B 47/00* | (2006.01) |
| *B64G 1/16* | (2006.01) |
| *B64C 39/02* | (2006.01) |
| *B64D 1/02* | (2006.01) |

(52) U.S. Cl.
CPC ........ *E05B 47/063* (2013.01); *E05B 47/0012* (2013.01); *H04L 9/0643* (2013.01); *B64C 39/024* (2013.01); *B64C 2201/128* (2013.01); *B64D 1/02* (2013.01); *B64G 1/16* (2013.01)

(58) Field of Classification Search
CPC ..... B64D 1/02; E05B 47/0012; E05B 47/063; E05B 2047/0088; E05B 35/007; E05B 47/0001; H04L 9/0643; H04L 9/3236; G07C 9/00817
See application file for complete search history.

(56) References Cited

U.S. PATENT DOCUMENTS

| | | | | |
|---|---|---|---|---|
| 4,991,415 A | * | 2/1991 | Shieh ................ | E05B 45/0605 70/268 |
| 2008/0028808 A1 | * | 2/2008 | Keller ............... | E05B 47/0642 70/277 |
| 2013/0298621 A1 | * | 11/2013 | Clifford ............. | E05B 19/0023 70/358 |
| 2019/0228602 A1 | * | 7/2019 | Fowler .............. | G07C 9/00817 |
| 2019/0228603 A1 | * | 7/2019 | Fowler .............. | G07C 9/00857 |

* cited by examiner

*Primary Examiner* — Omeed Alizada
(74) *Attorney, Agent, or Firm* — Ronald Krosky (57) ABSTRACT

Various embodiments that pertain to signal based arrangement of pin tumbler pins are described. A receiver can receive and process a signal. The signal can indicate an arrangement for the pins of the pin tumblers. With a proper signal, the pins can be placed so that the pin tumbler unlocks. Security measures can be put into place to make sure the signal is a valid signal, such as through employment of a hash function set (e.g., two hash functions).

18 Claims, 13 Drawing Sheets

SIGNAL BASED ARRANGEMENT OF PIN TUMBLER PINS

GOVERNMENT INTEREST

The innovation described herein may be manufactured, used, imported, sold, and licensed by or for the Government of the United States of America without the payment of any royalty thereon or therefor.

BACKGROUND

Security can be an important aspect in a wide variety of industries. In one example, for the home security industry, a person can have a desire to secure their home so that only authorized people can enter. In another example, for the finance industry, a bank can employ deposit boxes that are individually accessible by certain customers. It can be desirable for these industries to use a locking mechanism to achieve their security goals.

SUMMARY

In one embodiment, a system can comprise an identification component configured to identify a signal. The system can also comprise a conversion component configured to convert the signal to a physical placement sequence that corresponds to the signal. The physical placement sequence can place a set of actuation devices into a physical arrangement and individual actuation devices can be individually associated with individual pins. The individual pins can be part of a pin tumbler apparatus with a lock status and an unlock status.

In another embodiment, a system can comprise a pin set and an actuation device set coupled to the pin set. The actuation device set can move linearly in response to a signal. In response to the linear movement of the actuation device, the pin set can move linearly.

In yet another embodiment, a method can comprise controlling a blocking mechanism to be in a first state such that the blocking mechanism prevents activation of a system. The method can also comprise controlling the blocking mechanism to be in a second state such that the blocking mechanism promotes activation of the system. Controlling the blocking mechanism to be in the first state can occur when a pin tumbler is unengaged. Controlling the blocking mechanism to be in the second state can occur when the pin tumbler is engaged. The engagement and the unengagement of the pin tumbler can be managed by way of an electrical signal.

BRIEF DESCRIPTION OF THE DRAWINGS

Incorporated herein are drawings that constitute a part of the specification and illustrate embodiments of the detailed description. The detailed description will now be described further with reference to the accompanying drawings as follows:

Multiple figures can be collectively referred to as a single figure. For example, FIG. 1 illustrates three subfigures—FIG. 1A, FIG. 1B, and FIG. 1C. These can be collectively referred to as 'FIG. 1.'

DETAILED DESCRIPTION

A signal can be used to manage locking and unlocking of a pin tumbler apparatus as opposed to using a key or other physical tool. The signal can be read and in response to a signal, a set of actuation devices can move the pins into an unlock position. The signal can be time based such that the unlock position lasts for a set amount of time.

Since signals can be compromised, added security features can be employed. In one embodiment, two hash functions can be used to verify the signal. The first hash function determines whether to activate the rotation device, and the second hash function determines the signals to the actuation devices. The correct signal will match both the first hash function, as well as the proper sequence of positions for the actuation devices which allow the apparatus to mechanically move (in one example, this occurs when the floating pins align properly with the shaft).

The following includes definitions of selected terms employed herein. The definitions include various examples. The examples are not intended to be limiting.

"One embodiment", "an embodiment", "one example", "an example", and so on, indicate that the embodiment(s) or example(s) can include a particular feature, structure, characteristic, property, or element, but that not every embodiment or example necessarily includes that particular feature, structure, characteristic, property, or element. Furthermore, repeated use of the phrase "in one embodiment" may or may not refer to the same embodiment.

"Computer-readable medium", as used herein, refers to a medium that stores signals, instructions and/or data. Examples of a computer-readable medium include, but are not limited to, non-volatile media and volatile media. Non-volatile media may include, for example, optical disks, magnetic disks, and so on. Volatile media may include, for example, semiconductor memories, dynamic memory, and so on. Common forms of a computer-readable medium may include, but are not limited to, a floppy disk, a flexible disk, a hard disk, a magnetic tape, other magnetic medium, other optical medium, a Random Access Memory (RAM), a Read-Only Memory (ROM), a memory chip or card, a memory stick, and other media from which a computer, a processor or other electronic device can read. In one embodiment, the computer-readable medium is a non-transitory computer-readable medium.

"Component", as used herein, includes but is not limited to hardware, firmware, software stored on a computer-readable medium or in execution on a machine, and/or combinations of each to perform a function(s) or an action(s), and/or to cause a function or action from another component, method, and/or system. Component may include a software controlled microprocessor, a discrete component, an analog circuit, a digital circuit, a programmed logic device, a memory device containing instructions, and so on. Where multiple components are described, it may be possible to incorporate the multiple components into one physical component or conversely, where a single component is described, it may be possible to distribute that single component between multiple components.

"Software", as used herein, includes but is not limited to, one or more executable instructions stored on a computer-readable medium that cause a computer, processor, or other electronic device to perform functions, actions and/or behave in a desired manner. The instructions may be embodied in various forms including routines, algorithms, modules, methods, threads, and/or programs, including separate applications or code from dynamically linked libraries.

Figure 1A:
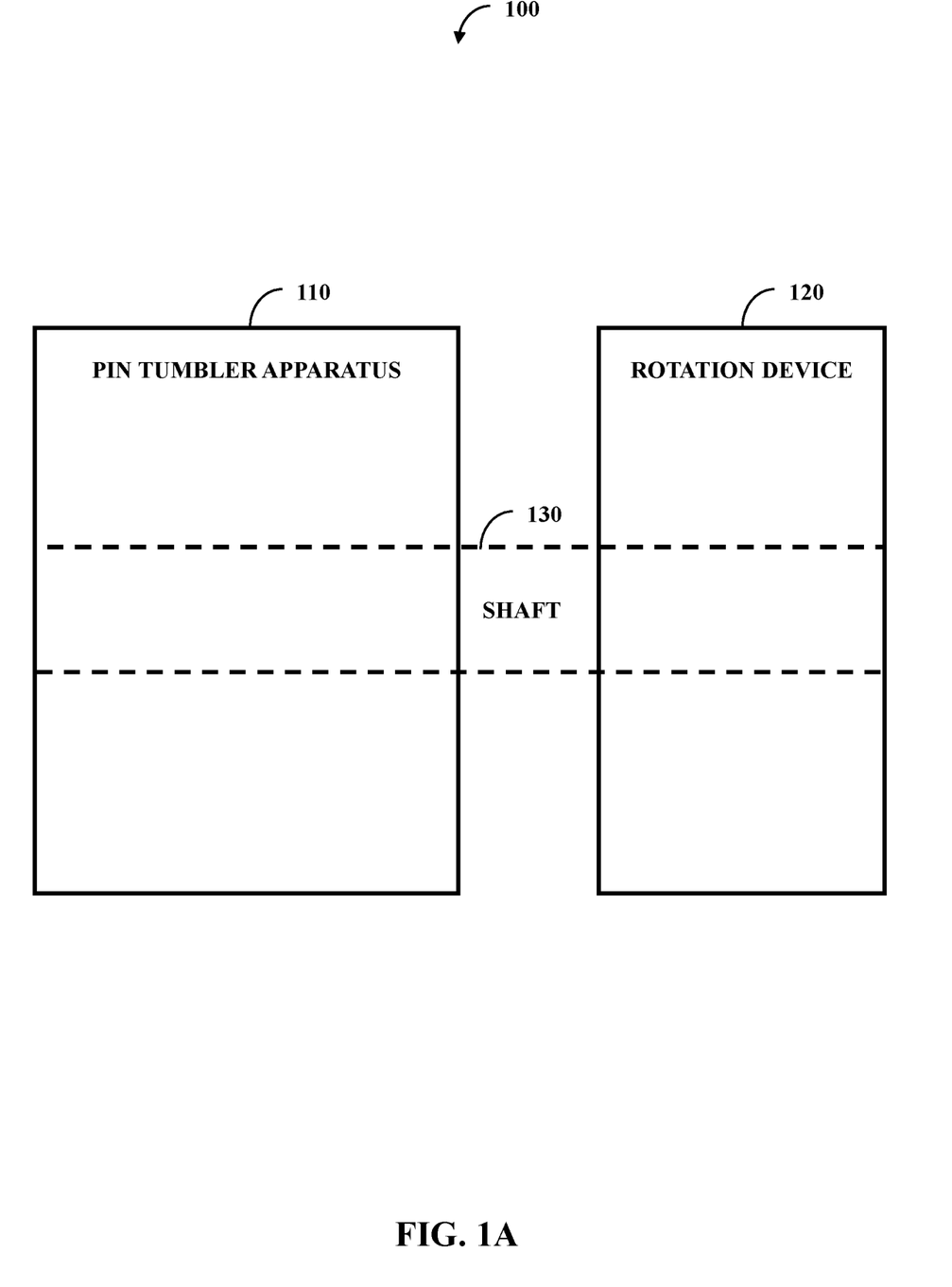
FIG. 1A illustrates one embodiment of a system comprising a pin tumbler apparatus, a rotation device, and a shaft.

FIG. 1A illustrates one embodiment of a system 100 comprising a pin tumbler apparatus 110, a rotation device 120, and a shaft 130. The pin tumbler apparatus 110 can function as a lock/unlock mechanism that regulates when the shaft 130 rotates and in turn when the rotation device 120 operates. In one example, the rotation device 120 can be an electric motor that operates when the shaft 130 is able to rotate. In another example, the rotation device 120 is a bolt lock on a home entry door.

Figure 1B:
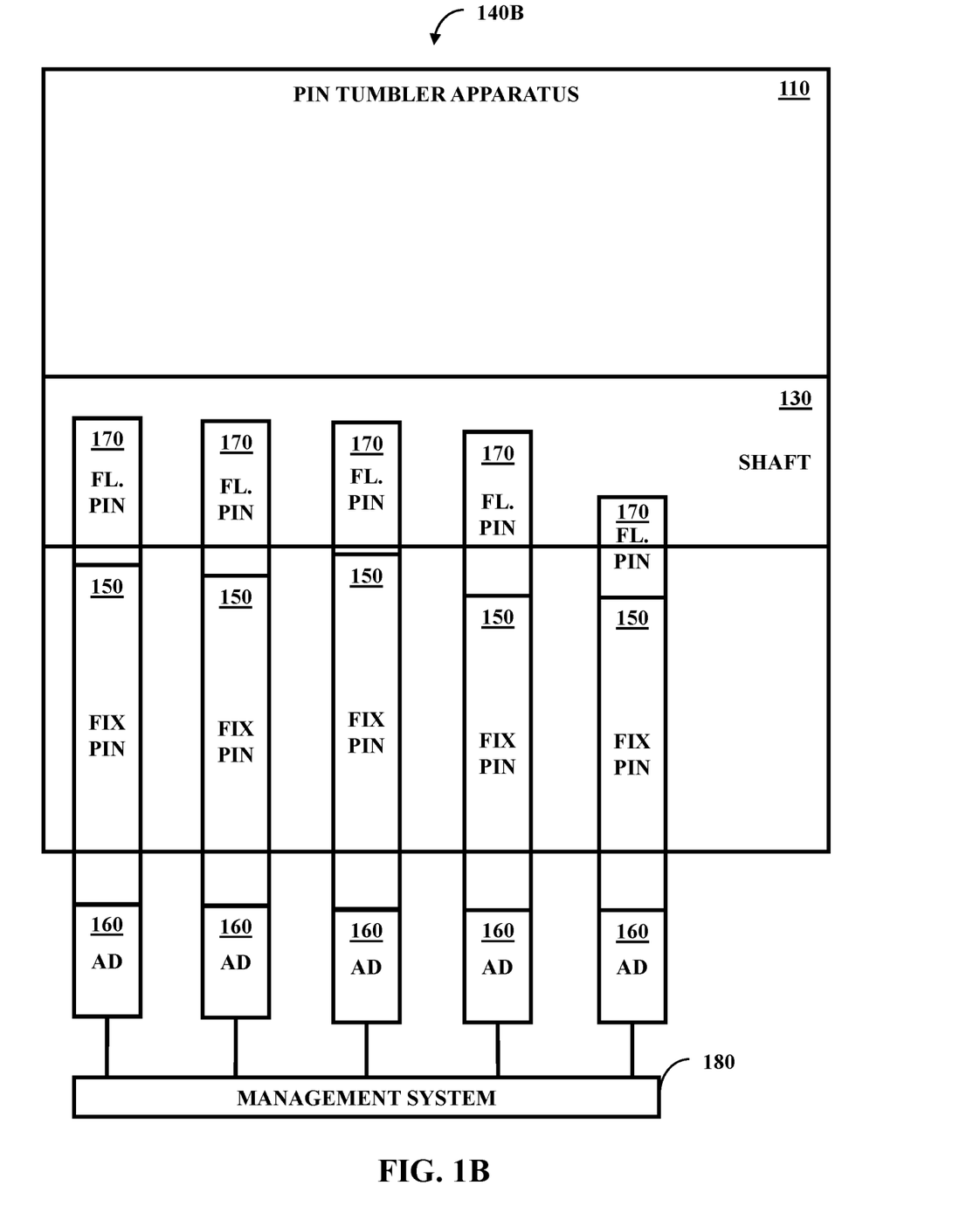
FIGS. 1B and 1C illustrate two embodiments of a system comprising the pin tumbler apparatus, the shaft, a set of fixed pins, a set of actuation devices, a set of floating pins, and a management system.
Figure 1C:
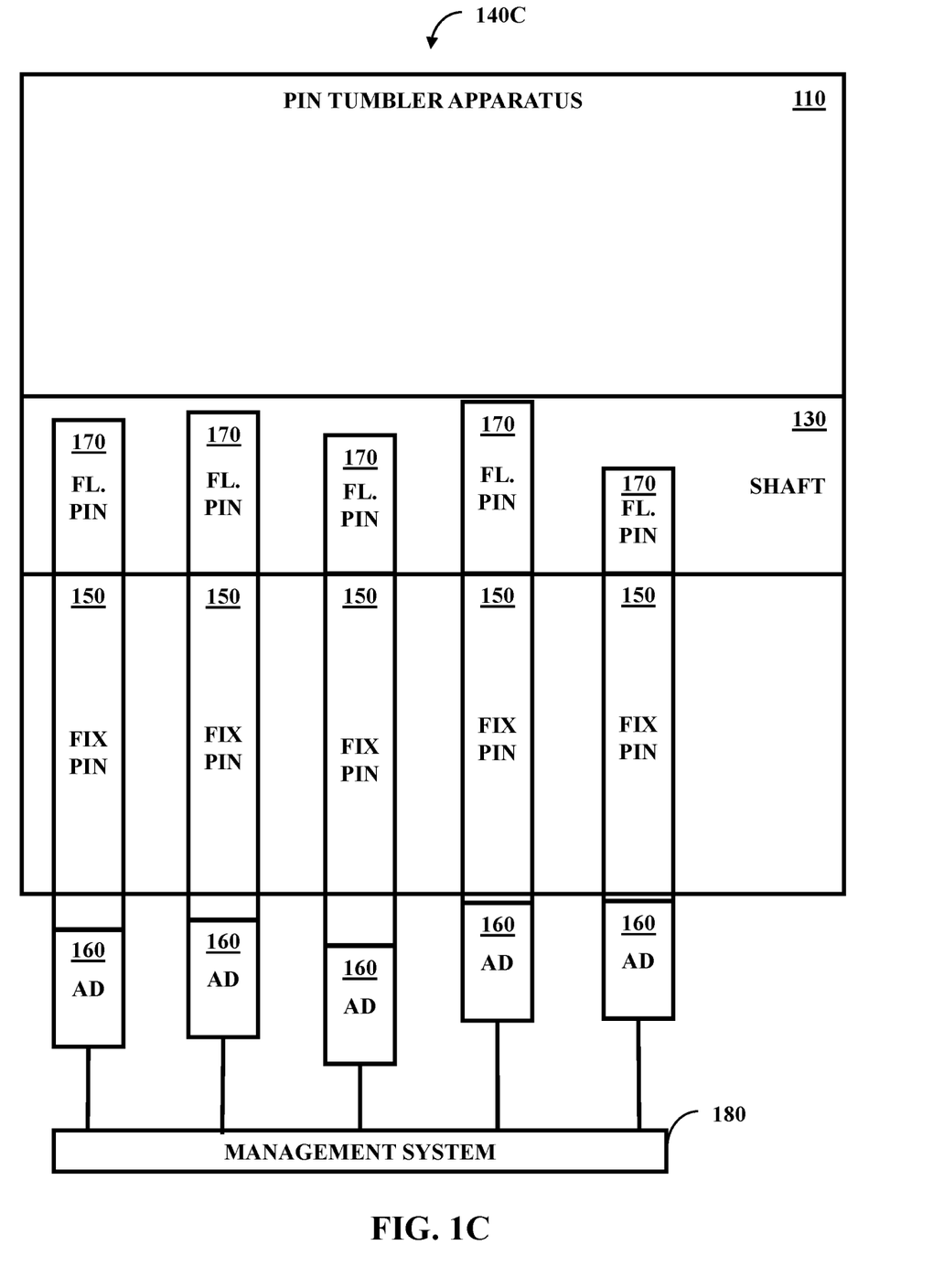

FIGS. 1B and 1C illustrate two embodiments of a system 140 (with configurations 140B and 140C) comprising the pin tumbler apparatus 110, the shaft 130, a set of fixed pins 150, a set of actuation devices 160, a set of floating pins 170, and a management system 180. A pin set can comprise the set of fixed pins 150 and the set of floating pins 170. Five individual pins with five individual fixed portions 150 (that make up the set of fixed pins 150) and five individual floating portions 170 (that make up the set of floating pins 170) are illustrated, but more or less can be used in implementation of aspects disclosed herein. The individual fixed portions 150 can be fixed (e.g., physically coupled) to the actuation device 160 (illustrated as five portions) and the individual floating portions 170 can be supported (e.g., not physically coupled, yet physically touching) by the individual fixed portions 150.

The management system 180 can be employed to manage the actuation device set 160. The management system 180 can comprise a reception component, an arrangement component, a movement component, a hash component, and a determination component. The reception component can receive a signal and the arrangement component can determine an arrangement for the pin set based on the signal. The signal can indicate physical placement for individual actuation devices of the actuation device set 160.

In one example, in a locked phase for the pin tumbler apparatus 110, the floating pin set 170 do not fall within the shaft 130 as illustrated in configuration 140B. With this, the floating pin set 170 can prevent the shaft 130 from rotating and therefore stop the rotation device 120 from operating. In an unlocked phase for the pin tumbler apparatus 110, the floating pin set does fall within the shaft 130 as illustrated in configuration 140C. In this configuration, the shaft 130 can freely rotate due to the shaft 130 being filled with the pin set (e.g., the floating pin set 170).

To facilitate transition from configuration 140B to configurator 140C, the reception component can receive a signal and the arrangement component can determine an arrangement for the pin set based on the signal. The movement component can move the actuation device set in accordance with the arrangement. In one example, this can cause the actuation device to move linearly in response to the signal and in response to the linear movement of the actuation device, the pin moves linearly, with the floating pin set 170 moving into the shaft 130. In one embodiment, various signals can move the actuation devices 160, but a limited signal set (e.g., exclusively one signal) can cause the pins to align so that the shaft 130 rotates. As an example of a failing signal, some floating pins 170 do not fully reach into the shaft 130 while other floating pins 170 go beyond the shaft 130, and other fixed pins reach into the shaft.

In one embodiment, the signal is a time-limited signal such that the arrangement is for a time span with a start time and an end time. Consider the following example. The system 100 can be employed in a safety environment with an alarm system. The alarm can be managed by the system 100. When the shaft rotates, an alarm sounds (e.g., the rotation device 120 being an alarm mechanism). The alarm system can be coupled with an industrial process that works with temperatures. If a device reached too high of a temperature, then the alarm can sound. However, if the device is no longer at the temperature, the alarm can stop (e.g., until the temperature rises too high again).

The management system can receive the signal and the signal can indicate that the alarm should sound. The movement component can be configured to move the actuation device set 160 from a rest position in accordance with the arrangement at the start time so that the alarm can sound. The movement component can be configured to move the actuation device set 160 from the arrangement to the rest position at the end time so the alarm no longer sounds.

The alarm can be configured to have its sound off, then on then off again (e.g., and then on again). In one example, during a first time span the actuation device set 160 does not move linearly in response to the signal (e.g., a timeframe before the signal is received). During a second time span, which immediately follows the first time span, the actuation device set 160 does move linearly in response to the signal (e.g., after signal is received and processed) such that the actuation device set 160, in response to the signal during the second time span, moves the individual fixed portion 150 and the individual fixed portion 150 moves the individual floating portion 170 into the shaft 130. During a third time span, which immediately follows the second time span, the actuation device set 160 does not move linearly in response to the signal (e.g., the signal is no longer supplied). With this, the pin set is aligned with the shaft 130 during the second time span due to the signal, but not the first time span or third time span.

In one example, springs can be used to cause a natural placement of the pin set to be not aligned. At an appropriate time (e.g., when an instruction is received), the management system 180 can overcome the springs, such as through physical force, to cause the pin set to move so the shaft 130 can rotate. After this is done, the management component 180 can stop exerting the force and the springs can cause the pin set to return to a state that stops the shaft from rotating.

Security can be an important aspect in many industries and therefore not only can the pin tumbler apparatus be a form of security in of itself, the management system 180 can employ security functions for the signal. Returning to the alarm example, instead of being an alarm for an industrial process, the alarm can be an evacuation alarm such as a fire alarm. A building associated with the evacuation alarm can be a secure location, such as a bank. A criminal could attempt to hack into the alarm system and send a signal causing the alarm to sound. When the alarm sounds and personnel evacuate, the criminal could steal money or personal information. To fight this, the management system 180 can perform a security check on the signal to determine if the signal is acceptable (e.g., a verified source supplies the signal).

In one embodiment, the management system 180 employs the hash component and the determination component for the security check. The hash component can submit the signal to a hash function to produce a hash function output, such as upon reception of the signal. The determination component can determine if the hash function output meets an expected output.

If the hash function output meets the expected output, then the signal can be considered verified. With the signal verified, the arrangement component can determine the arrangement and/or the movement component can move the actuation device set 160. If the hash function output does not meet the expected output, then the signal can be considered unverified. With the signal unverified, the arrangement component does not determine the arrangement and/or the movement component does not move the actuation device set 160.

Figure 2:
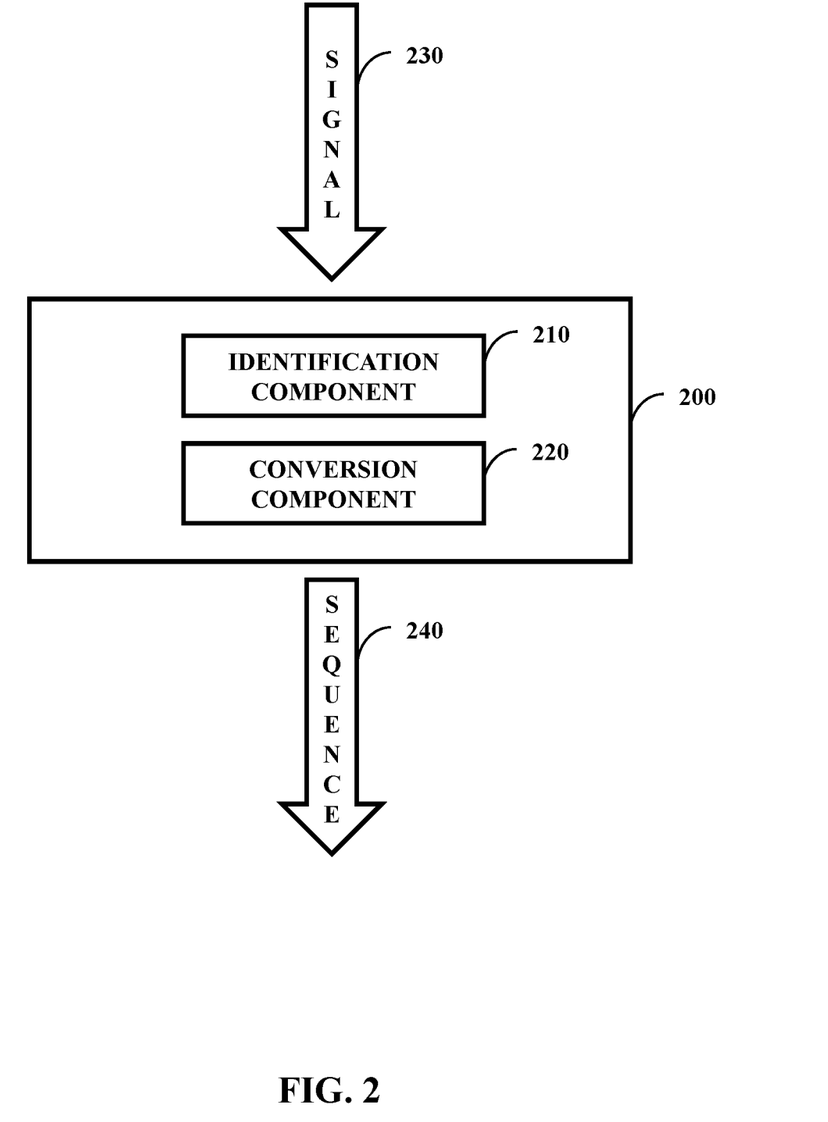
FIG. 2 illustrates one embodiment of a system comprising an identification component and a conversion component.

FIG. 2 illustrates one embodiment of a system 200 comprising an identification component 210 and a conversion component 220. The identification component 210 can be configured to identify a signal 230. The conversion component 220 can be configured to convert the signal 220 to a physical placement sequence 240 that corresponds to the signal 230. The physical placement sequence 240 places, when implemented, the actuation device set 160 of FIG. 1 into a physical arrangement. The individual actuation devices 160 of FIG. 1 are individually associated with individual pins that are part of the pin tumbler apparatus 110 of FIG. 1 with a lock status (e.g., the configuration 140B of FIG. 1) and an unlock status (e.g., the configuration 140C of FIG. 1).

The physical arrangement causes the pin tumbler apparatus 110 of FIG. 1 to be in the unlock status. Absent the physical arrangement, the pin tumbler apparatus 110 of FIG. 1 is caused to be in the locked status. When the pin tumbler apparatus 110 of FIG. 1 is coupled to the shaft 130 of FIG. 1 of the rotation device 120 of FIG. 1 (e.g., a shaft of a motor), when the pin tumbler apparatus 110 of FIG. 1 is in the unlock status the shaft 130 of FIG. 1 rotates and when in the locked status the shaft 130 of FIG. 1 does not rotate.

Figure 3:
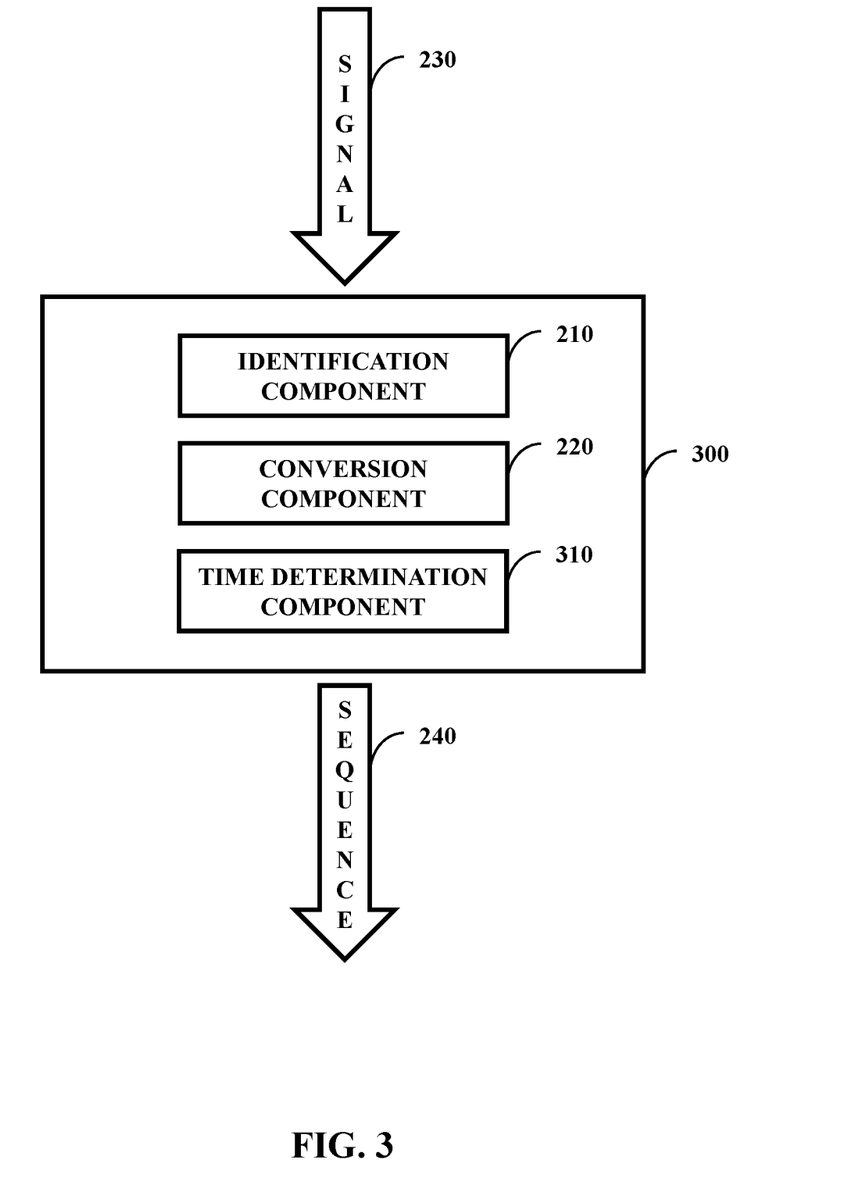
FIG. 3 comprises one embodiment of a system comprising the identification component, the conversion component, and a time determination component.

FIG. 3 comprises one embodiment of a system 300 comprising the identification component 210, the conversion component 220, and a time determination component 310. The time determination component 310 can be configured to determine a time span, with a start time and an end time, for the physical arrangement. Immediately before the start time and immediately after the end time the pin tumbler apparatus 110 of FIG. 1 is in the lock status. During the time span, the pin tumbler apparatus 110 of FIG. 1 can be in an unlocked status.

Figure 4:
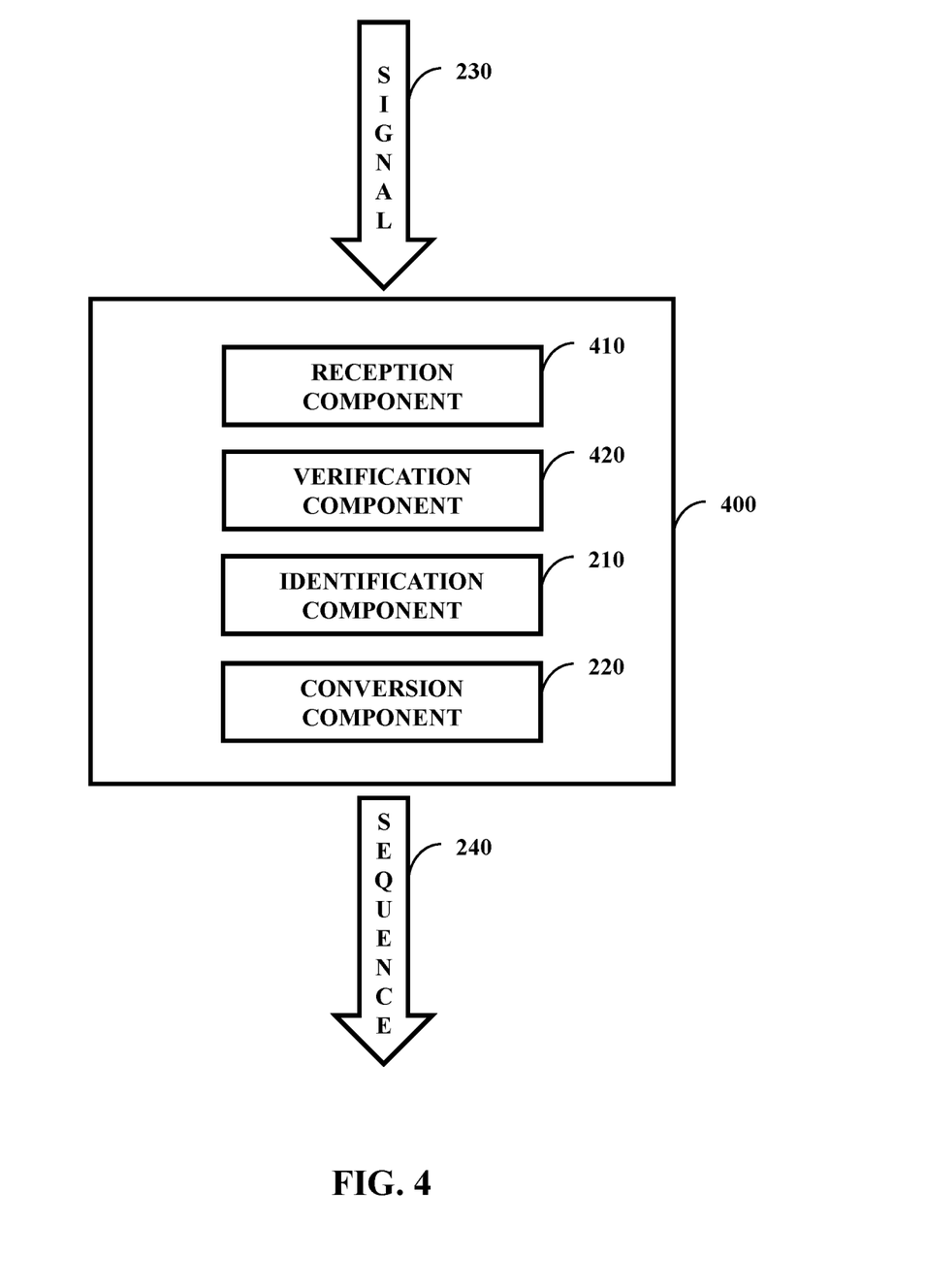
FIG. 4 comprises one embodiment of a system comprising a reception component, a verification component, the identification component, and the conversion component.

FIG. 4 comprises one embodiment of a system 400 comprising a reception component 410, a verification component 420, the identification component 210, and the conversion component 220. The reception component 410 can be configured to receive the signal 230 and the verification component 420 can be configured to verify if the signal is or is not a rouge signal, such as by way of a hash function. The conversion component 220 can be configured to convert the signal 230 to the physical placement sequence 240 when the signal 230 is verified to not be a rouge signal (e.g., the signal 230 from an acceptable source). The conversion component 220 can be configured to not convert the signal 230 to the physical placement sequence 240 when the signal 230 is not verified to not be a rouge signal (e.g., identified as being a rouge signal or not able to determine if the signal 230 is rouge or not).

Figure 5A:
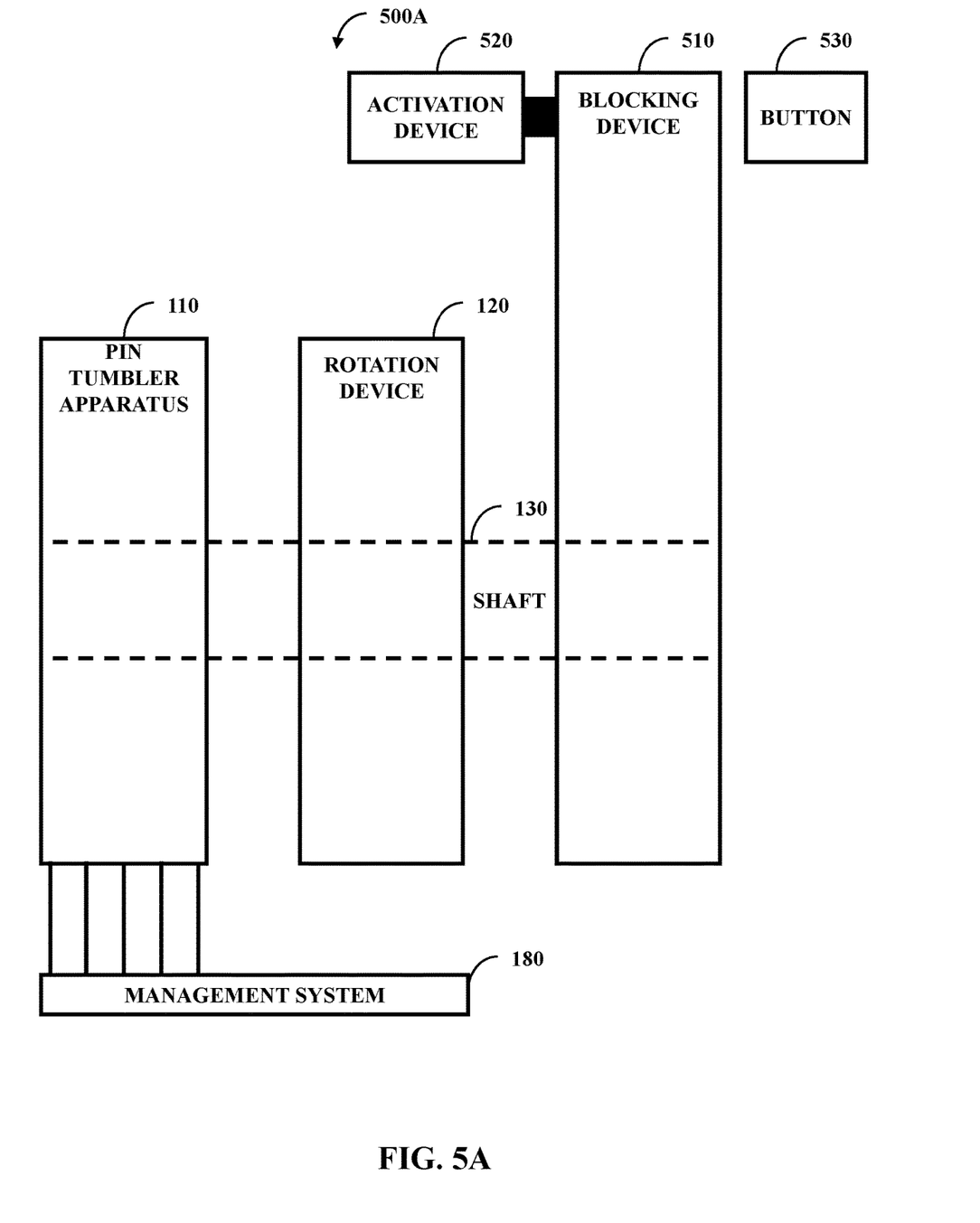
FIGS. 5A and 5B illustrate two embodiments of a system comprising the pin tumbler apparatus, the shaft, the rotation device, the management system, a blocking device, an activation device, and a button.
Figure 5B:
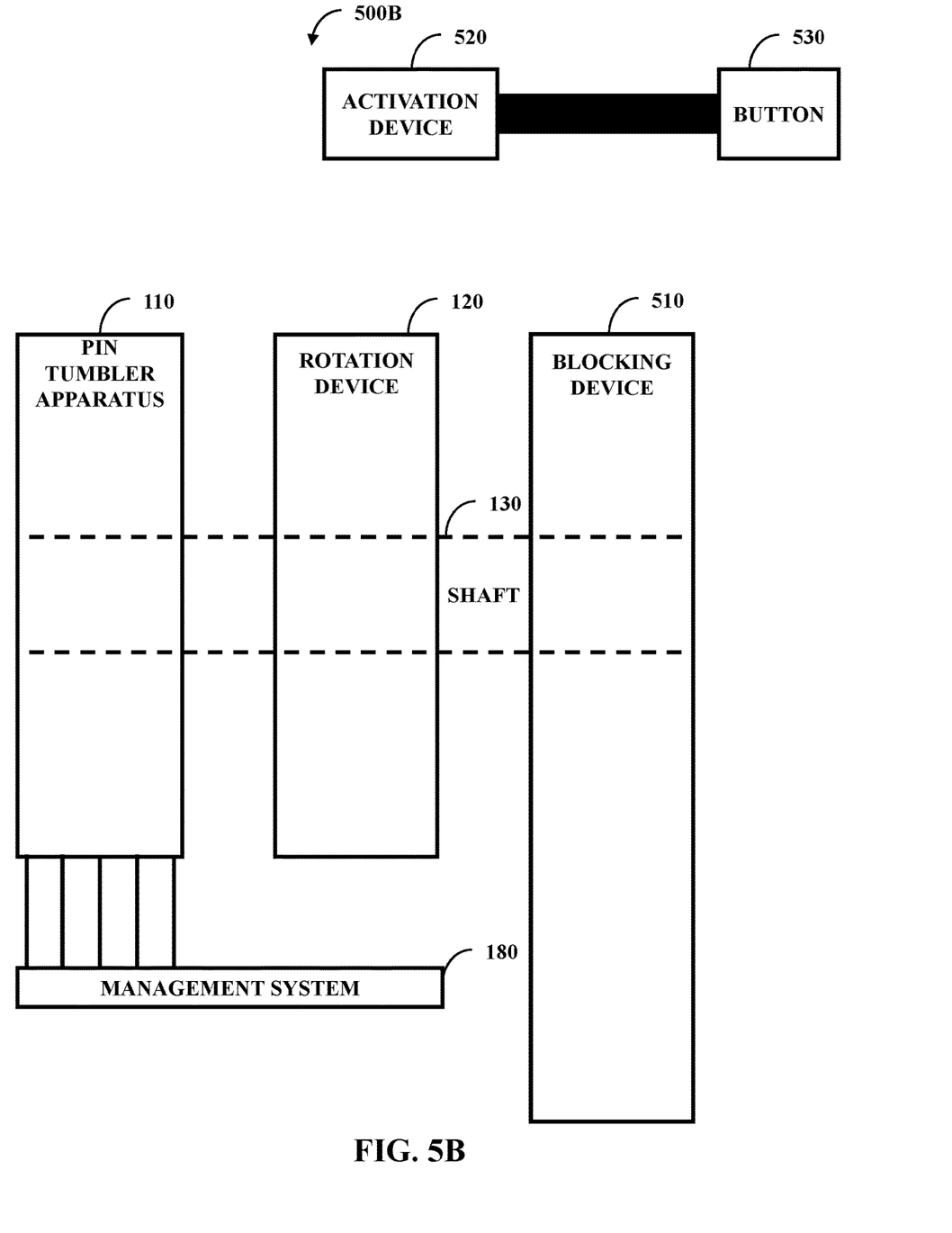

FIGS. 5A and 5B illustrate two embodiments of a system 500 (in two states 500A and 500B, respectively) comprising the pin tumbler apparatus 110, the shaft 130, the management system 180, a blocking device 510, an activation device 520, and a button 530. In one embodiment, the system 500 can be implemented on an unmanned flight machine (e.g., helicopter) designated to drop an unmanned vehicle. In one example, the unmanned vehicle can be released on a surface of another planet.

It would not be desirable for the release to be random, but instead at a specific time (e.g., in response to a command being received or in response to a condition being met, such as being within a set distance of the surface). The blocking device 510 can block the activation device 520 from engaging the button 530, where the button can cause the vehicle to be released.

Figure 6:
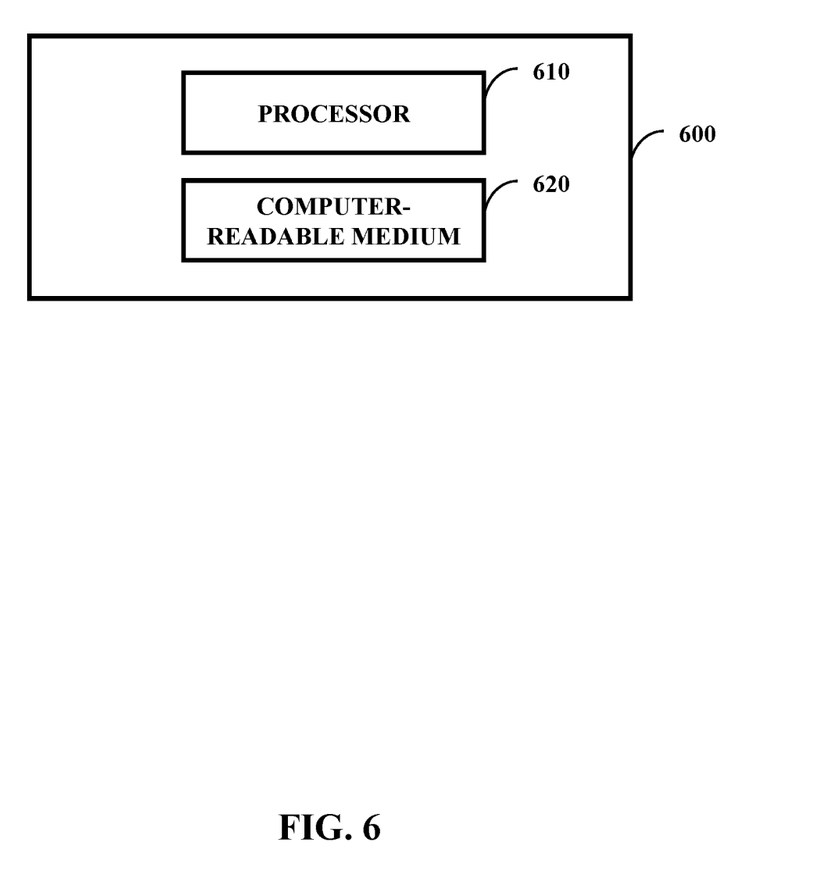
FIG. 6 illustrates one embodiment of a system comprising a processor and a computer-readable medium.

FIG. 6 illustrates one embodiment of a system 600 comprising a processor 610 and a computer-readable medium 620 (e.g., non-transitory computer-readable medium). In one embodiment, the computer-readable medium 620 is communicatively coupled to the processor 610 and stores a command set executable by the processor 610 to facilitate operation of at least one component disclosed herein (e.g., the movement component or the arrangement component discussed above). In one embodiment, at least one component disclosed herein (e.g., the hash component or the determination component discussed above) can be implemented, at least in part, by way of non-software, such as implemented as hardware by way of the system 600. In one embodiment, the computer-readable medium 620 is configured to store processor-executable instructions that when executed by the processor 610, cause the processor 610 to perform at least part of a method disclosed herein (e.g., at least part of one of the methods 700 or 800 discussed below).

Figure 7:
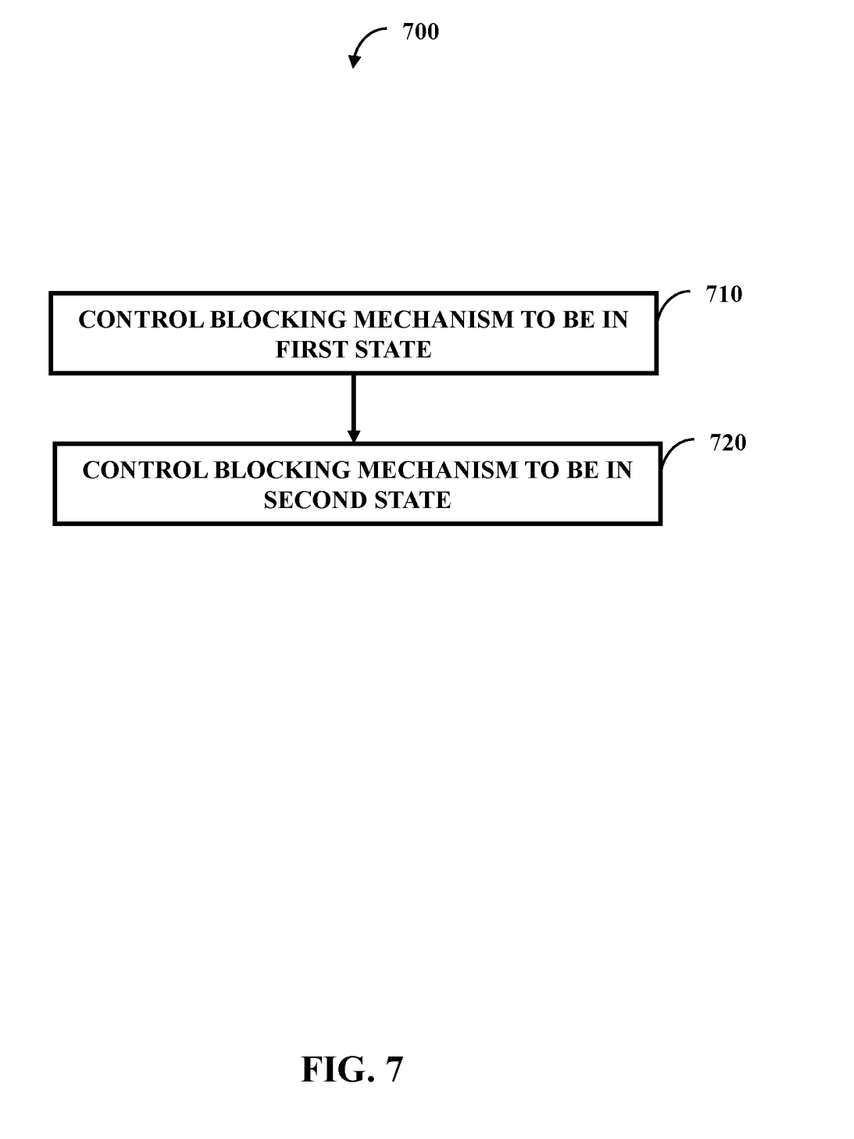
FIG. 7 illustrates one embodiment of a method comprising two actions.

FIG. 7 illustrates one embodiment of a method 700 comprising two actions 710-720. At 710, there can be controlling a blocking mechanism (e.g., the blocking device 510 of FIG. 5) to be in a first state such that the blocking mechanism prevents activation of a system (e.g., prevent the activation device 520 of FIG. 5A from engaging the button 530 of FIG. 5A). At 720, there can be controlling the blocking mechanism to be in a second state such that the blocking mechanism promotes activation of the system (e.g., promotes the activation device 520 of FIG. 5B to engage the button 530 of FIG. 5B).

When the pin tumbler apparatus 110 of FIG. 1 is unengaged (e.g., the floating pin set 170 of FIG. 1 is not within the shaft 130 of FIG. 1), the blocking mechanism can be in the first state and when the pin tumbler apparatus 110 of FIG. 1 is engaged (e.g., the floating pin set 170 of FIG. 1 is within the shaft 130 of FIG. 1), the blocking mechanism can be in the second state. This engagement and unengagement can be managed by way of an electrical signal.

Figure 8:
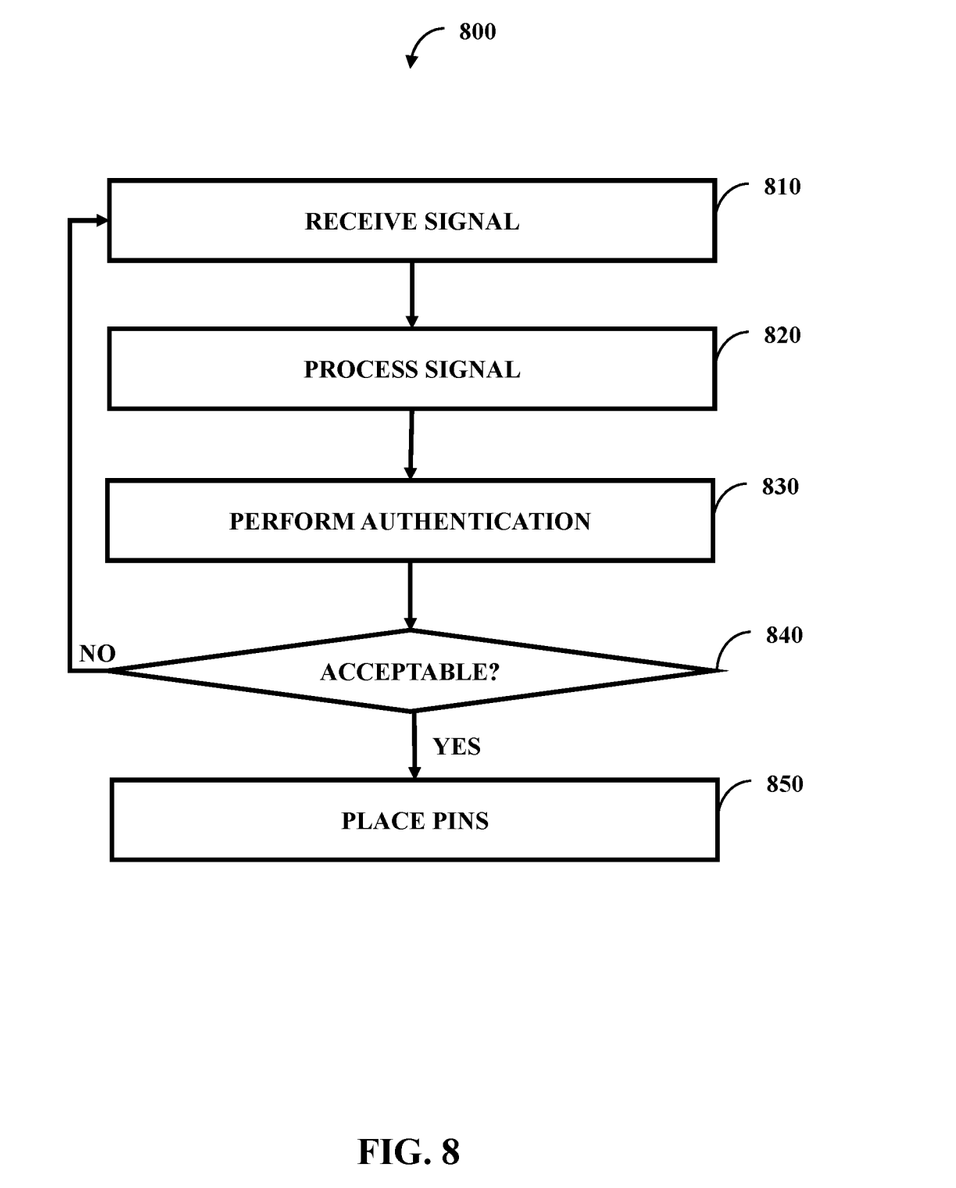
FIG. 8 illustrates one embodiment of a method comprising five actions.

FIG. 8 illustrates one embodiment of a method 800 comprising five actions 810-850. The method 800 can be, at least in part, an implementation of the method 700 of FIG. 7. At 810, the signal can be received and processed at 820. In one example, the processing can be subjecting the electrical signal through a hash function to produce a hash result. At 830, authenticating the electrical signal by way of the hash result can occur. At 840, a determination can be made on if the hash result is acceptable. If the determination is that the hash result is acceptable, then the method 800 can continue to 850 where placing individual pins of the pin tumbler apparatus 110 of FIG. 1 in a position set in accordance with the electrical signal can occur (e.g., a physical location based on content of the electrical signal). If the determination is that the hash result is not acceptable, then the placement of the pins does not occur and the method 800 can return to 810 to receive another signal.

In one embodiment, the method 800 can perform a second hash action. As part of processing the electrical signal there can also be processing a known value through the hash function to produce a second hash result. Authentication at 830 can include authenticating the electrical signal by way of the second hash result. With this authentication, even if the electrical signal is found to be acceptable, if the known value fails the hash, then the electrical signal can be considered not authenticated.

The method 800 can function such that the pins are moved in response to the signal. However, if this signal is not an unlock signal, movement of the pins does not actually unlock anything. With this, the pins are moved, but still in a locked position.

Figure 9:
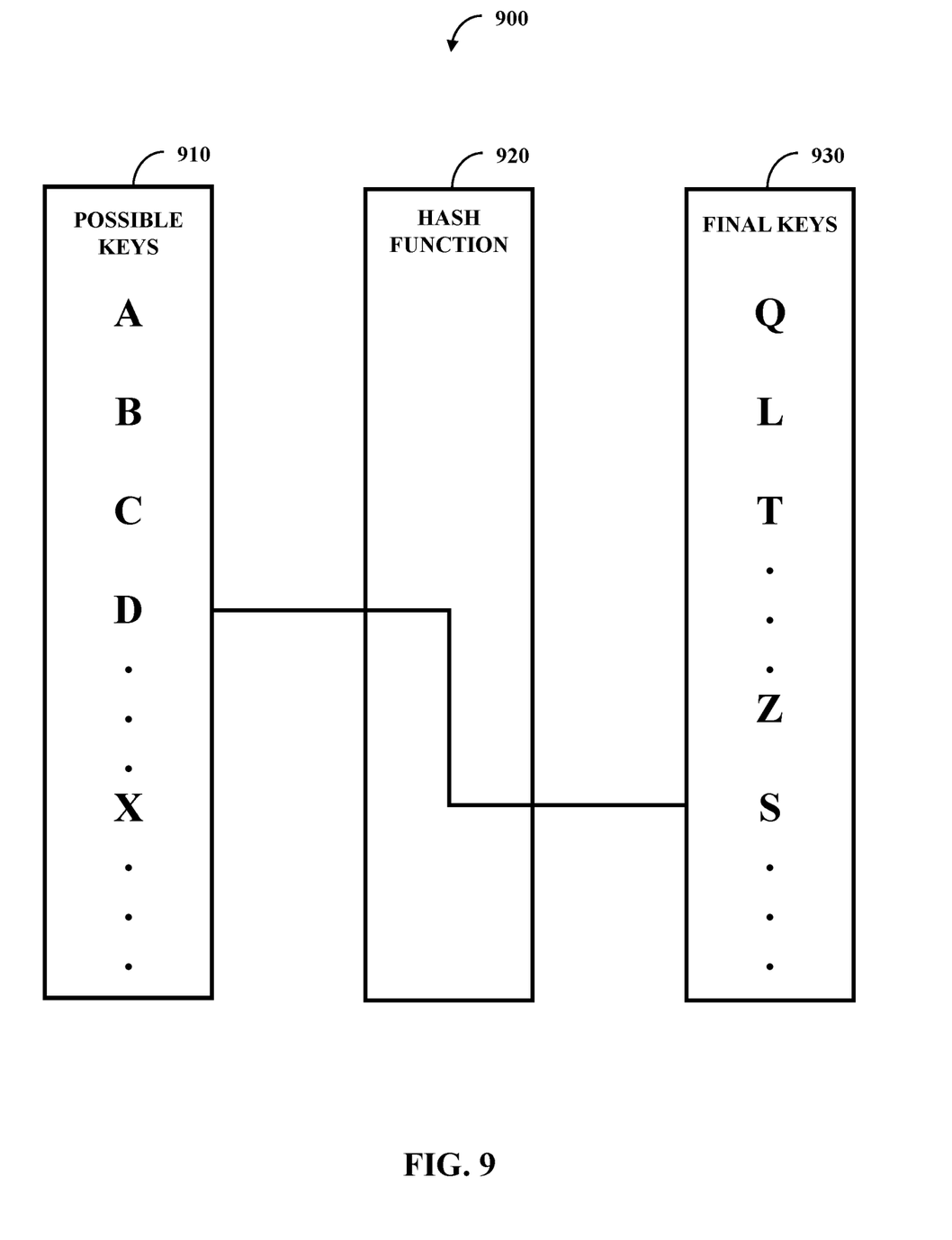
FIG. 9 illustrates one embodiment of a hash configuration comprising possible keys, a second hash function, and possible keys.

FIG. 9 illustrates one embodiment of a hash configuration 900 comprising possible keys 910, a hash function 920, and possible keys 930. Various security features can be implemented to prevent system failure, including uses of hashes and other methods. Returning to the vehicle release discussed in FIG. 5, security can be implemented to ensure that unintended release does not occur. This can include intentional security threats (e.g., a cyberattack) or unintentional security threats (e.g., short circuit or power surge produced from nature).

In one embodiment, the configuration 900 is implemented on the management system 180 of FIG. 1. The management system 180 of FIG. 1, by way of the reception component, receives the signal and subjects the signal to a cryptographic hash by way of the configuration 900. If the signal passes the cryptographic hash, then the signal can be used to move the pin set.

In one example, the signal can send five values—A, B, C, D, and X as illustrated in the possible keys 910. These values can be number strings sent through one or more hash functions. In this example, the hash function 920 subjects the values to a hash function (e.g., algorithm). The output can correspond to a result in the final keys 930. In one example, the possible key value 'D' can, after the $2^{nd}$ hash function 920 operates, result in an output of 'S' from the final keys. 'S' can be instruct the management system 180 of FIG. 1 to move the fourth actuation device 160 of FIG. 1 into a specific physical position. The management component 180 of FIG. 1 can work with (e.g., comprise) an integrated circuit with individual wires that correspond to individual actuation devices 160 of FIG. 1. The management component 180 of FIG. 1 can subject the final keys to a second hash with something stored locally to verify the final key to make sure the hash functions properly and an accidental random signal is not received and so happens to be correct to accidentally open a lock. In one example, a local value can be subjected to the hash function 920 and the result can be compared to 'S' to determine if 'S' has an acceptable value. When acceptable, the management component 180 of FIG. 1 uses 'S' to move the fourth actuation device 160 of FIG. 1 and when not, the shaft 130 of FIG. 1 may not even try to rotate. The other four actuation devices 160 can be controlled by the values 'A', 'B', 'C', and 'X' (e.g., 'A' for furthest left, then 'B', then 'C', then 'D', and 'X' furthest right).

Figure 10:
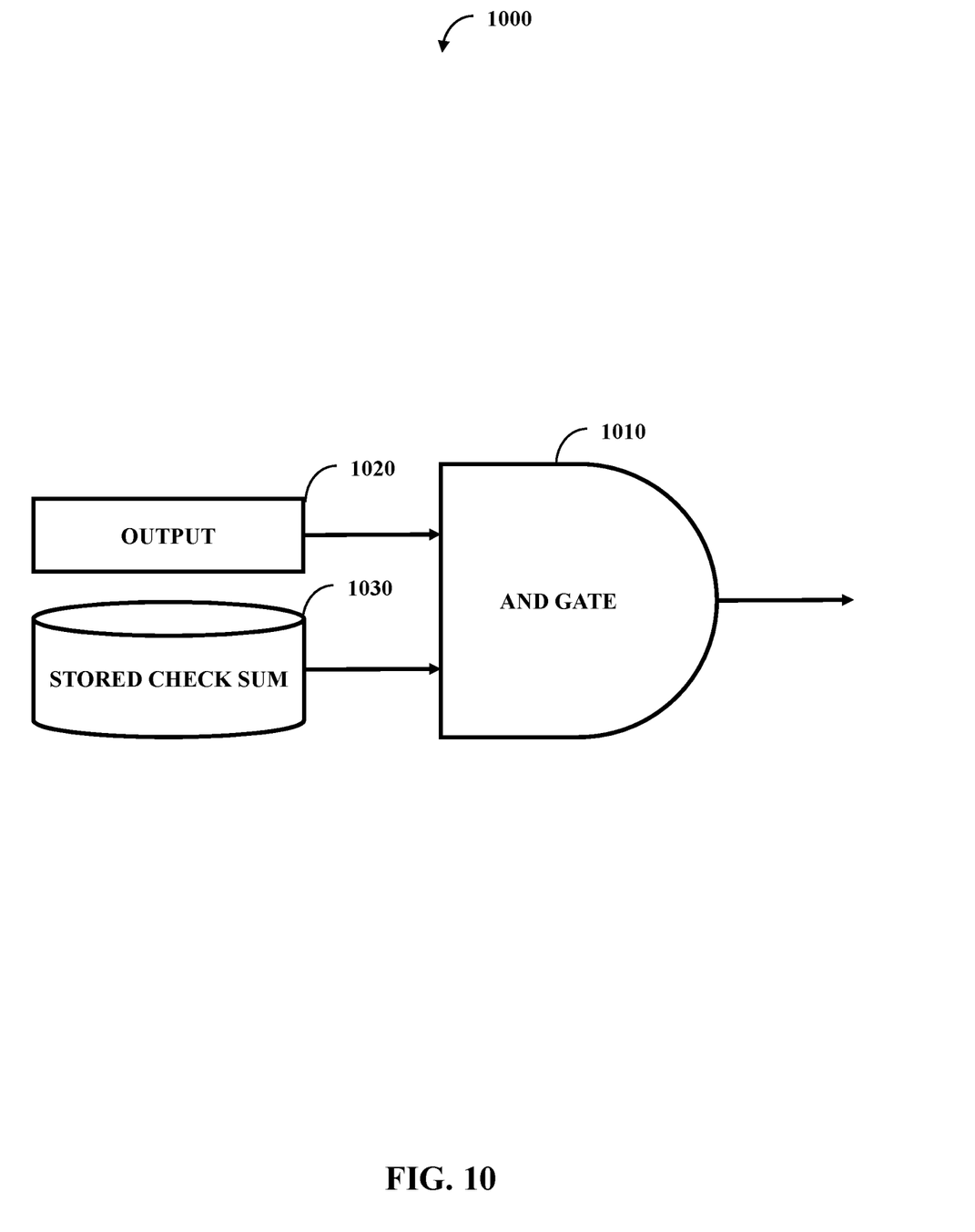
FIG. 10 illustrates one embodiment of a logic gate configuration comprising an AND gate, an output, and a stored check sum.

FIG. 10 illustrates one embodiment of a logic gate configuration 1000 comprising an AND gate 1010, an output 1020, and a stored check sum 1030. The configuration 1000 can be employed to run the second hash check. The output 1020 can be the 'S' from above. The stored check sum 1030 can be the result from a known value run through the hash function 920 of FIG. 9. The AND gate 1010 can compare the two and if they match, then an instruction can be to move the appropriate actuation device 160 of FIG. 1.

While the methods disclosed herein are shown and described as a series of blocks, it is to be appreciated by one of ordinary skill in the art that the methods are not restricted by the order of the blocks, as some blocks can take place in different orders.

What is claimed is:

1. A system, comprising:
an identification component configured to identify a signal;
a conversion component configured to convert the signal to a physical placement sequence that corresponds to the signal, the physical placement sequence places a set of actuation devices into a physical arrangement; and
a time determination component configured to determine a time span for the physical arrangement,
where individual actuation devices are individually associated with individual pins,
where the individual pins are part of a pin tumbler apparatus with a lock status and an unlock status,
where the physical arrangement causes the pin tumbler apparatus to be in the unlock status,
where absent the physical arrangement, the pin tumbler apparatus is caused to be in the locked status,
where the time span has a start time,
where the time span has an end time,
where immediately before the start time the pin tumbler apparatus is in the lock status, and
where immediately after the end time the pin tumbler apparatus is in the lock status.

2. The system of claim 1,
where the individual pins comprise a fixed portion and a floating portion,
where the individual fixed portions are coupled, individually, with individual actuation devices,
where the floating portion is movable by movement of the fixed portion,
where in the unlock status, the floating portion is moved into the pin tumbler apparatus, and
where in the lock status, the floating portion is moved out of the pin tumbler apparatus.

3. A system, comprising:
an identification component configured to identify a signal;
a reception component configured to receive the signal;
a verification component configured to verify if the signal is not a rouge signal; and a conversion component configured to convert the signal to a physical placement sequence that corresponds to the signal when the signal is verified to not be a rouge signal, where the conversion component is configured to not convert the signal to the physical placement sequence when the signal is not verified to not be a rouge signal, where the physical placement sequence places a set of actuation devices into a physical arrangement, where individual actuation devices are individually associated with individual pins, and where the individual pins are part of a pin tumbler apparatus with a lock status and an unlock status.

4. The system of claim 3, where the verification component verifies the signal by way of at least two hash functions.

5. The system of claim 1, comprising:

a reception component configured to receive the signal; and a verification component configured to verify if the signal is not a rouge signal and configured to determine if the signal indicates the physical placement sequence, where the conversion component is configured to convert the signal to the physical placement sequence when the signal is verified to not be a rouge signal and the signal is determined to indicate the physical placement sequence and where the conversion component is configured to not convert the signal to the physical placement sequence when the signal is not verified to not be a rouge signal, when the signal is determined to not indicate the physical placement sequence.

6. The system of claim 5, where the verification component configured to verify if the signal is not the rouge signal through employment of a first hash function, where the verification component configured to determine if the signal indicates the physical placement sequence through employment of a second hash function, and where the first hash function is different from the second hash function.

7. The system of claim 1, where the pin tumbler apparatus is coupled to a blocking mechanism, where when the pin tumbler apparatus is in the lock status, the blocking mechanism prevents an activation device from causing an operation of a device, and where when the pin tumbler apparatus is in the unlock status, the blocking mechanism promotes the activation device from causing the operation of the device.

8. The system of claim 1, where the signal indicates the time span.

9. The system of claim 1, where when the pin tumbler apparatus is coupled to a shaft of a motor, where when the pin tumbler apparatus is in the unlock status, the shaft rotates, and where when the pin tumbler apparatus is in the lock status, the shaft does not rotate.

10. The system of claim 3, comprising:

a source identification component configured to identify a source of the signal; and a check component configured to perform a check if the source of the signal is an acceptable source, where the verification component verifies that the signal is not a rouge signal when the check has a result that the source of the signal is the acceptable source and where the verification component does not verify that the signal is not a rouge signal when the check has a result that the source of the signal is not the acceptable source.

11. The system of claim 10, where the individual pins comprise a fixed portion and a floating portion, where the individual fixed portions are coupled, individually, with individual actuation devices, where the floating portion is movable by movement of the fixed portion, where in the unlock status, the floating portion is moved into the pin tumbler apparatus, and where in the lock status, the floating portion is moved out of the pin tumbler apparatus.

12. The system of claim 11, where when the pin tumbler apparatus is coupled to a shaft of a motor, where when the pin tumbler apparatus is in the unlock status, the shaft rotates, and where when the pin tumbler apparatus is in the lock status, the shaft does not rotate.

13. The system of claim 12, where the motor controls a blocking mechanism, where when the pin tumbler apparatus is in the lock status, the blocking mechanism prevents an activation device from causing an operation of a device, and where when the pin tumbler apparatus is in the unlock status, the blocking mechanism promotes the activation device from causing the operation of the device.

14. The system of claim 11, where the pin tumbler apparatus is coupled to a blocking mechanism, where when the pin tumbler apparatus is in the lock status, the blocking mechanism prevents an activation device from causing an operation of a device, and where when the pin tumbler apparatus is in the unlock status, the blocking mechanism promotes the activation device from causing the operation of the device.

15. The system of claim 11, comprising:

a time determination component configured to determine a time span for the physical arrangement, where the time span has a start time, where the time span has an end time, where immediately before the start time the pin tumbler apparatus is in the lock status, and where immediately after the end time the pin tumbler apparatus is in the lock status.

16. The system of claim 3, where when the pin tumbler apparatus is coupled to a shaft of a motor, where when the pin tumbler apparatus is in the unlock status, the shaft rotates, and where when the pin tumbler apparatus is in the lock status, the shaft does not rotate.

17. The system of claim 3, where the individual pins comprise a fixed portion and a floating portion, where the individual fixed portions are coupled, individually, with individual actuation devices, where the floating portion is movable by movement of the fixed portion, where in the unlock status, the floating portion is moved into the pin tumbler apparatus, and where in the lock status, the floating portion is moved out of the pin tumbler apparatus.

18. The system of claim 3,
where the pin tumbler apparatus is coupled to a blocking mechanism,
where when the pin tumbler apparatus is in the lock status, the blocking mechanism prevents an activation device from causing an operation of a device, and
where when the pin tumbler apparatus is in the unlock status, the blocking mechanism promotes the activation device from causing the operation of the device.

* * * * *